US012666413B2

(12) United States Patent
Syed Muhammad et al.

(10) Patent No.: US 12,666,413 B2
(45) Date of Patent: Jun. 23, 2026

(54) EXTENDED CAPABILITY FOR TRANSMISSION SWITCHING

(71) Applicant: Nokia Technologies Oy, Espoo (FI)

(72) Inventors: Fahad Syed Muhammad, Massy (FR); Lei Du, Beijing (CN); Karri Markus Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/287,508

(22) Filed: Jul. 31, 2025

(65) Prior Publication Data

US 2025/0365720 A1 Nov. 27, 2025

Related U.S. Application Data

(63) Continuation of application No. PCT/CN2023/076487, filed on Feb. 16, 2023.

(51) Int. Cl.
| | |
|---|---|
| *H04W 4/00* | (2018.01) |
| *H04W 56/00* | (2009.01) |
| *H04W 72/0446* | (2023.01) |
| *H04W 72/0453* | (2023.01) |
| *H04W 72/51* | (2023.01) |

(52) U.S. Cl.
CPC ... *H04W 72/0453* (2013.01); *H04W 56/0045* (2013.01); *H04W 72/0446* (2013.01); *H04W 72/51* (2023.01)

(58) Field of Classification Search
CPC ............. H04W 72/0453; H04W 72/51; H04W 72/0446; H04W 56/0045
USPC ........................................................ 370/329
See application file for complete search history.

(56) References Cited

U.S. PATENT DOCUMENTS

| | | |
|---|---|---|
| 2019/0394634 A1 | 12/2019 | Akkarakaran et al. |
| 2020/0037383 A1* | 1/2020 | Rico Alvarino .. H04W 72/0453 |
| 2020/0162144 A1* | 5/2020 | Zhou ..................... H04L 5/0048 |
| 2022/0303973 A1* | 9/2022 | Sun ........................ H04W 72/51 |
| 2022/0311503 A1* | 9/2022 | Islam ................. H04W 72/046 |
| 2022/0346048 A1* | 10/2022 | Ruttik ................ H04B 7/18513 |

FOREIGN PATENT DOCUMENTS

WO 2023/000307 A1 1/2023

OTHER PUBLICATIONS

International Search Report and Written Opinion dated Oct. 13, 2023 corresponding to International Patent Application No. PCT/CN2023/076487.
China Telecommunication et al., "UE capability reporting and RRC configuration for Rel-17 UL Tx switching enhancements," R2-2108274, 3GPP TSG-RAN WG2 Meeting #115 electronic Online, Aug. 27, 2021.

* cited by examiner

*Primary Examiner* — Temica M Beamer
(74) *Attorney, Agent, or Firm* — SQUIRE PATTON BOGGS (US) LLP

(57) ABSTRACT

Example embodiments of the present disclosure relate to methods, devices, apparatuses and computer readable storage medium for extended capability for transmission switching. In a method, a first device transmits, to a second device, at least one indication of capability for transmission switching across a plurality of bands. The at least one indication is related to at least frequency of the transmission switching allowed by the first device. The first device receives, from the second device, a configuration for the transmission switching.

20 Claims, 2 Drawing Sheets

TRANSMIT, TO A SECOND DEVICE, AT LEAST ONE INDICATION OF CAPABILITY FOR TRANSMISSION SWITCHING ACROSS A PLURALITY OF BANDS, THE AT LEAST ONE INDICATION BEING RELATED TO AT LEAST FREQUENCY OF THE TRANSMISSION SWITCHING ALLOWED BY THE FIRST DEVICE

RECEIVE, FROM THE SECOND DEVICE, A CONFIGURATION FOR THE TRANSMISSION SWITCHING

400

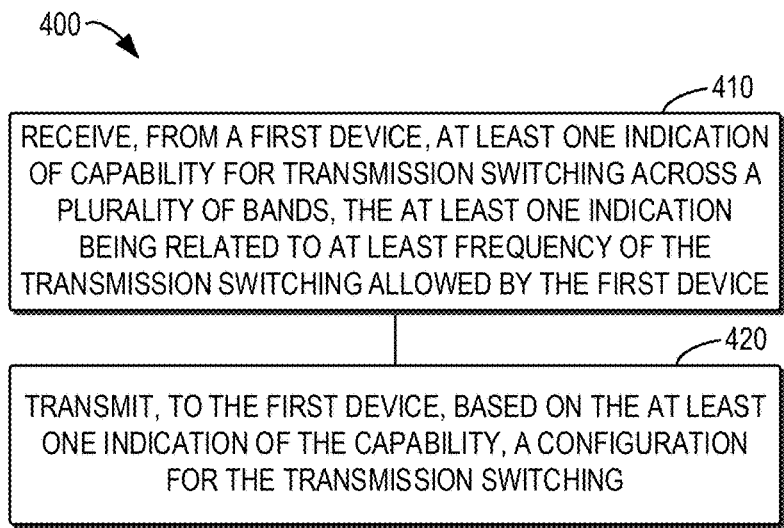

410

RECEIVE, FROM A FIRST DEVICE, AT LEAST ONE INDICATION OF CAPABILITY FOR TRANSMISSION SWITCHING ACROSS A PLURALITY OF BANDS, THE AT LEAST ONE INDICATION BEING RELATED TO AT LEAST FREQUENCY OF THE TRANSMISSION SWITCHING ALLOWED BY THE FIRST DEVICE

420

TRANSMIT, TO THE FIRST DEVICE, BASED ON THE AT LEAST ONE INDICATION OF THE CAPABILITY, A CONFIGURATION FOR THE TRANSMISSION SWITCHING

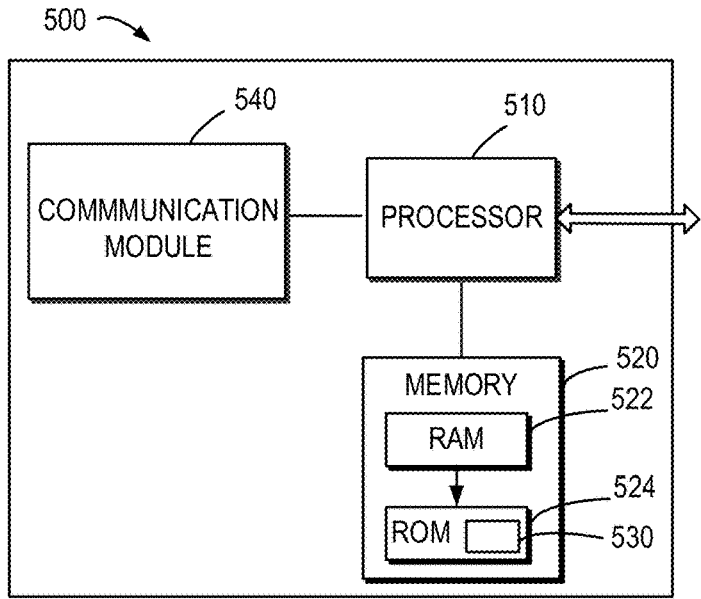

540

COMMMUNICATION MODULE

510

PROCESSOR

520

MEMORY

522

RAM

524

ROM

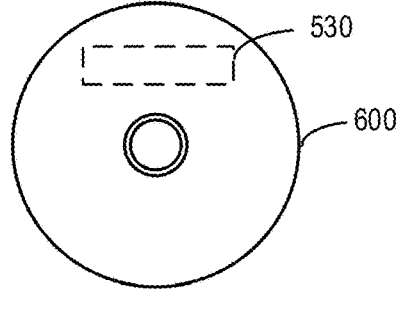

EXTENDED CAPABILITY FOR TRANSMISSION SWITCHING

CROSS-REFERENCE TO RELATED APPLICATION

This application is a bypass continuation of PCT Application No. PCT/CN2023/076487, filed on Feb. 16, 2023, which is incorporated herein by reference in its entirety.

FIELDS

Various example embodiments of the present disclosure generally relate to the field of telecommunication and in particular, to methods, devices, apparatuses and computer readable storage medium for extended capability for transmission switching.

BACKGROUND

Uplink (UL) transmission or transmitter (Tx) switching may be supported in a fifth generation (5G) New Radio (NR) system. In Release 16 (R16), switching between two carriers on two separate frequency bands may be supported where one of the two carriers supports 1Tx transmission and the other supports 2Tx transmission such as Multiple-Input Multiple-Output (MIMO) transmission in the uplink. In Release 17 (R17), the functionality may be extended to support switching between two bands, where both bands may support 2Tx uplink MIMO. In Release 18 (R18), the UL Tx switching may be further extended across 3 or 4 bands. However, the UL Tx switching may cause downlink (DL) interruptions and throughput performance degradation.

SUMMARY

In a first aspect of the present disclosure, there is provided a method. The method comprises: at a first device, transmitting, to a second device, at least one indication of capability for transmission switching across a plurality of bands, the at least one indication being related to at least frequency of the transmission switching allowed by the first device; and receiving, from the second device, a configuration for the transmission switching.

In a second aspect of the present disclosure, there is provided a method. The method comprises: at a second device, receiving, from a first device, at least one indication of capability for transmission switching across a plurality of bands, the at least one indication being related to at least frequency of the transmission switching allowed by the first device; and transmitting, to the first device, based on the at least one indication of the capability, a configuration for the transmission switching.

In a third aspect of the present disclosure, there is provided a first device. The first device comprises at least one processor; and at least one memory storing instructions that, when executed by the at least one processor, cause the first device at least to perform: transmitting, to a second device, at least one indication of capability for transmission switching across a plurality of bands, the at least one indication being related to at least frequency of the transmission switching allowed by the first device; and receiving, from the second device, a configuration for the transmission switching.

In a fourth aspect of the present disclosure, there is provided a second device. The second device comprises at least one processor; and at least one memory storing instructions that, when executed by the at least one processor, cause the second device at least to perform: receiving, from a first device, at least one indication of capability for transmission switching across a plurality of bands, the at least one indication being related to at least frequency of the transmission switching allowed by the first device; and transmitting, to the first device, based on the at least one indication of the capability, a configuration for the transmission switching.

In a fifth aspect of the present disclosure, there is provided a first apparatus. The first apparatus comprises means for transmitting, to a second device, at least one indication of capability for transmission switching across a plurality of bands, the at least one indication being related to at least frequency of the transmission switching allowed by the first device; and means for receiving, from the second device, a configuration for the transmission switching.

In a sixth aspect of the present disclosure, there is provided a second apparatus. The second apparatus comprises means for receiving, from a first device, at least one indication of capability for transmission switching across a plurality of bands, the at least one indication being related to at least frequency of the transmission switching allowed by the first device; and means for transmitting, to the first device, based on the at least one indication of the capability, a configuration for the transmission switching.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 4 illustrates a flowchart of a method implemented at a second device according to some example embodiments of the present disclosure;

FIG. 5 illustrates a simplified block diagram of a device that is suitable for implementing example embodiments of the present disclosure; and FIG. 6 illustrates a block diagram of an example computer readable medium in accordance with some example embodiments of the present disclosure.

Throughout the drawings, the same or similar reference numerals represent the same or similar element.

DETAILED DESCRIPTION

Figure 1:
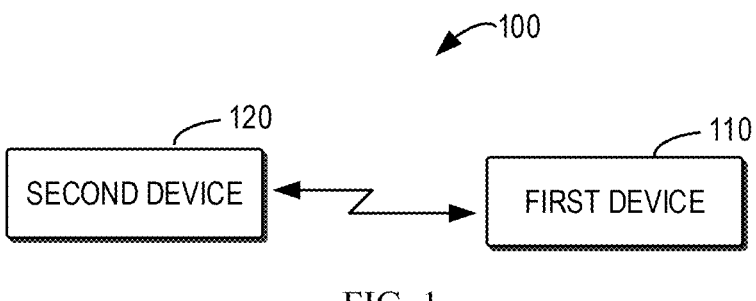
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (encoded or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As described above, UL transmission or transmitter (Tx) switching may be supported in a 5G NR system. Switching between two carriers on two separate frequency bands may be supported in R16. The functionality may be extended in R17 to support switching between two bands, where one of the two bands may support two contiguous uplink carriers, the switching may take place between bands, and both bands may support uplink MIMO. For multi-carrier enhancements for NR, the UL Tx switching may be further extended in R18 across 3 or 4 bands.

In UL Tx switching across 3 or 4 bands, the switching of each transmitter still occurs between 2 bands but the bands on which user equipment (UE) is transmitting are dynamically selected from 3 or 4 configured bands so that at any given time at most two uplink transmitters are transmitting. This includes the act of one transmitter being moved to operate from band A to band B, where the A and B are any two bands out of the 3 or 4 bands. This may also include the act of two transmitters being switched. Then, each one of the two transmitters may switch somewhat independently, e.g. from bands A and B to bands C and D, in which one transmitter switches from band A to band C (or D), and the other transmitter switches from B to D (or C). For example, the UE may transmit uplink MIMO on any one of the 3 or 4 configured bands, while all other bands cannot be used for transmission. Then, the UE may switch to transmit UL MIMO transmission on one other band out of the set of configured bands. Alternatively, the UE may transmit 1Tx transmission on one band and another 1Tx transmission on another band while other bands in the configuration are not used for uplink transmission.

However, the UL Tx switching may cause downlink (DL) interruption and even UL outage which may introduce additional UL interruption due to the extension of UL TX switching for 2 bands from 1 timing advance group (TAG) to 2 TAGs. The UL outage may refer to actual impacted UL Orthogonal Frequency Division Multiple (OFDM) symbols on serving carriers involved in the switching, actual impacted UL OFDM symbols on other victim serving carriers which are not involved in the switching, and/or a potential interruption window. DL interruption requirements may be defined in radio resource management (RRM) impact due to Tx switching across 3 or 4 bands.

DL carriers may be interrupted due to UL switching, and hence DL system performance may be degraded. Moreover, UL system performance improvements may be sought from switching the uplink transmit band. However, a network may likely not schedule the UE during these interrupted symbols because the UE cannot be expected to be able to receive the DL signals or transmit the UL signals and scheduling data on these symbols may be lost or distorted and impact the link performance (increased block error rate), which may degrade the throughput performance.

In R18, the UL switching may be scheduled dynamically across 3 or 4 bands. This gives more flexibility on selecting switching carriers, but it may also potentially impact both DL and UL throughput performance due to frequent switches causing frequent interruptions loss. An objective of UL Tx switching is to boost UL throughput performance while using higher bandwidth on Time Division Duplex (TDD) or NR carriers particularly. DL throughput is also considered to be an important aspect. However, it may be evident that more frequent interruptions would cause degradation in DL throughput, and to UL throughput as well to some extent. Hence, such frequent UL switching may be avoided or at least restricted to ensure a gain from UL switching.

In addition, while the UL switching is dynamically scheduled across 3 or 4 bands, the diversity of the switching cases may be increased, where the switching may be between 1Tx and 2Tx or between 2Txs, and the switching may be between carriers in single TAG or 2 TAGs. For example, for switchedUL operation, if a UE supports up to 2 ports UL transmission on all the bands in a band combination, the two transmitters may be mapped as 2Tx (or "2T") on one band. Switching may involve 2T switching from one band to another band. In case of 3 bands, switching may occur between 3 transmitter settings ({2T,0T,0T}, {0T,2T,0T}, {0T,0T,2T}). In case of 4 bands, switching may occur between 4 transmitter settings ({2T,0T,0T,0T}, {0T,2T,0T, 0T}, {0T,0T,2T,0T}, {0T,0T,0T,2T}) For DualUL operation, the two transmitters may also be mapped as 1Tx (or "1T") on one band and 1T on another band. Switching cases may involve 1T switching from one band to another band. For example, switching may occur between 6 additional transmitter settings ({1T,1T,0T,0T}, {1T,0T,1T,0T}, {1T,0T,0T, 1T}, {0T,1T,1T,0T}, {0T, 1T,0T,1T}, {0T,0T,1T,1T}).

Even if the UE is transmitting with only one transmitter on only one band (e.g, denoted as {1T, 0T, 0T}), or it is not transmitting at all {0T, 0T, 0T}, the UE transmitters that are not in use are still set on one of the bands in the band combination. Mapping of a non-transmitting transmitter to a band is a function of UE configuration and past transmissions.

Each of the switching cases may lead to different set of carriers being interrupted as the switch-from and switch-to carriers are different. Moreover, the interruption length may depend on a sub-carrier spacing (SCS) of carriers involved or impacted due to transmission switching, and thus switching period (hence the interruption length) may also be different. For different switching cases, the switching gap may be required for every UL transmission with a changing transmitting band from preceding transmission. Thus, each of the UL switching cases may have different impact on the interruption hence a different performance loss.

Example embodiments of the present disclosure propose a scheme to reduce or control the performance degradation considering the diverse UL switching cases and especially their different impact to system performance. With the scheme, a first device such as a UE indicates, to a second device such as a network device, its capability for transmission switching across a plurality of bands. The capability includes how frequent the device may be able to perform transmission switching. Based on such an indication, the second device transmits to the first device a configuration for the transmission switching to set the first device to the transmission switching mode, for example.

In this way, the transmission switching of the first device may be configured based on the capability of the first device with respect to how frequent the first device is able to do the Tx switching. Such configuration is more flexible and efficient.

FIG. 1 illustrates an example communication environment 100 in which example embodiments of the present disclosure can be implemented. In the communication environment 100, a plurality of communication devices, including a first device 110 and a second device 120, can communicate with each other.

In the following, for the purpose of illustration, some example embodiments are described with the first device 110 operating as a terminal device such as a UE and the second device 120 operating as a network device such as a base station. However, in some example embodiments, operations described in connection with a terminal device may be implemented at a network device or other devices, and operations described in connection with a network device may be implemented at a terminal device or other devices.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver). In some example embodiments, both the first and second devices 110 and 120 may be terminal devices which can communicate with each other in Sidelink (SL).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the numbers of devices are only for the purpose of illustration without suggesting any limitations. The communication environment 100 may include any suitable numbers of devices for implementing embodiments of the present disclosure.

In the environment 100, the first device 110 may perform transmission switching. For example, in the example embodiments where the first device 110 operates as a 2Tx UE, for multi-carrier UL operation, the first device 110 as a 2Tx UE may be configured with at least 2 UL bands, which may be changed by radio resource control (RRC) reconfiguration from a network. UL Tx switching may be performed between 2 UL bands for the first device 110. Dynamically selecting carriers with UL Tx switching, for example, based on data traffic, TDD DL/UL configuration, bandwidths and channel conditions of each band may potentially lead to a higher UL data rate, spectrum utilization and UL capacity.

When dynamic switching between two uplink carriers is conducted, the first device 110 may be allowed to cause DL interruption of X OFDM symbols in NR downlink carrier(s). The DL interruption starts from the first OFDM symbol which fully or partially overlaps with the UL switching period located in either NR carrier 1 or carrier 2 as indicated in RRC signalling e.g. a UE capability message. The DL interruption length on NR carrier(s) in the unit of OFDM symbols (X) for switching between two uplink carriers may be defined in Table 1 as follows.

TABLE 1

| μ | NR Slot length (ms) | Uplink Tx switching period | | |
|---|---|---|---|---|
| | | 35 us | 140 us | 210 us |
| 0 | 1 | 2 | 3 | 4 |
| 1 | 0.5 | 3 | 6 | 7 |
| 2 | 0.25 | 4 | 10 | 14 |

In some example embodiments, the first device 110 as a 2Tx UE may support Tx switching across up to 3 or 4 bands with restriction of up to 2 Tx simultaneous transmission where the two transmitters may be mapped either as 2T on one band (for example, SwitchedUL), or as 1T on one band and 1T on another band (for example, DualUL), to enable more configured UL bands than its simultaneous transmission capability and to support dynamic Tx carrier switching across the configured bands for both single TAG and multiple TAGs configurations.

Following restrictions may be applied for UL Tx switching across 3 or 4 bands. The first device 110 may not expect to perform more than one uplink switching within a reference slot based on SCSs of active UL bandwidth parts of the bands in a band combination. If two uplink switching are triggered and result in UL transmissions on more than 2 bands within any two consecutive reference slots, then the time duration between the end of all transmission(s) prior to the first uplink switching and the start of all transmission(s) after the second uplink switching within the two reference slots may be expected to be not less than a minimum separation time. The minimum separation time is a sum of Y us and the switching gap required for the second uplink switching. Y us may be subject to UE capability with a value set of {0 us, 500 us}.

In various example embodiments, the transmission switching is configured for the first device 110 considering at least one indication for capability of the first device 110 with respect to at least frequency of the transmission switching across a plurality of bands. Some example implementations will be discussed below with reference to FIG. 2.

Figure 2:
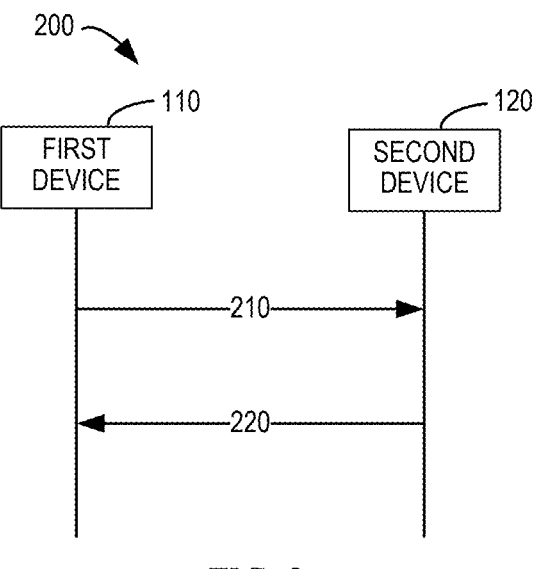
FIG. 2 illustrates a signaling diagram for configuring transmission switching according to some example embodiments of the present disclosure.

FIG. 2 shows a signaling diagram 200 for configuring transmission switching according to some example embodiments of the present disclosure. For the purpose of discussion, the signaling diagram 200 will be described with reference to FIG. 1.

As shown in FIG. 2, the first device 110 transmits (205), to the second device 120, at least one indication of capability for transmission switching across a plurality of bands. The capability includes how frequent the first device 110 may be able to perform the transmission switching. Accordingly, the at least one indication is related to at least frequency of the transmission switching allowed by the first device 110.

The indication may be related to any parameter related to the frequency of the transmission switching. In an example, the indication may comprise an indication for the number of transmission switching across the plurality of bands within a predetermined time period such as the maximum number of switching across the configured bands within a certain time period. Alternatively, or in addition, the indication may comprise an indication for the number of time intervals between consecutive transmission switching such as the minimum number of symbols or slots between two consecutive switching. For example, if more frequent switching may be allowed at the first device 110, the larger number of transmission switching within a predetermined time period may be indicated by the first device 110, and/or the smaller number of time intervals (such as symbols or slots) between the consecutive switching may be indicated by the first device 110. In an example, the indication may comprise an indication if some transmission switching case is allowed or not allowed. This can be achieved e.g. by setting the number of transmission switching across the plurality of bands within a predetermined time period to zero or by setting the number of time intervals between consecutive transmission switching to infinite.

In some example embodiments, these parameters may be per device (for example, per UE). For example, the number of transmission switching within a predetermined time period and/or the number of time intervals between consecutive transmission switching may be indicated for the first device 110.

In some example embodiments, the frequency of the transmission switching may be indicated for a combination of bands (or "band combination"), between which transmission switching is performed, from among the plurality of bands. For example, the related parameters may be indicated per band combination. In an example, the transmission switching from a combination of band 1 and band 2 to a combination of band 3 and band 4 may be less frequent than the transmission switching from a combination of band 1 and band 2 to a combination of band 1 and 3 since the former one may introduce more interruptions.

In some example embodiments, the frequency of the transmission switching may be indicated based on an impact level of the transmission switching, for example, whether the switching may bring severe impact or not. The more severe the impact is, the switching case may be allowed less often. Thus, these switching cases may need to be differentiated when defining the restriction. In an example, the frequency of the transmission switching may be indicated for each set of the switching cases which brings a different impact level.

Such an impact level may be associated with the number of switched transmitters in the transmission switching. The number of Tx chains being switched may involve the following cases: case 1 where 1Tx on one band is switched to 2Tx on that band, and case 2 where 2Tx on one band is switched to 2Tx on another band. Case 2 may have a higher impact level compared to case 1. Accordingly, a tighter requirement such as stricter parameters may be indicated, including, for example, the larger number of symbols/slots before the next switch which corresponds to a longer silence period between two switches.

Alternatively, or in addition, the impact level may be associated with interrupted bands in the transmission switching. For example, more bands are interrupted, more severe impact may be brought. Thus, a tighter requirement may be indicated for the frequency of the switching.

In some example embodiments, the impact level of the switching may be associated with the number of downlink and/or uplink carriers impacted by the transmission switching and/or an aggregated bandwidth of impacted downlink and/or uplink carriers. In an example, if a long interruption such as 14 symbols is expected, the first device 110 may need more time to prepare for the switching. Hence, different values of the parameters may be set for no-interruption switching and for long-interruption switching. For example, a longer silence period may be indicated for long-interruption switching.

In some example embodiments, the impact level of the switching may be associated with the number of TAGs related to the transmission switching. Switching within 1 TAG and switching across 2 TAGs may induce different outage time of the first device 110 which may bring different interruptions. In an example, a tighter requirement may be indicated for a case of switching across 2 TAGs (also referred to as "2TAG case").

In some example embodiments, the impact level may be associated with an interruption duration caused by the transmission switching. For example, a switch between a band combination, for example, from band A to band B may lead to a different interruption duration than a switch between another band combination, for example, from band B to band C. Thus, different requirements may be indicated for the frequency of the switching.

In addition to the frequency of the switching, in some example embodiments, the at least one indication for the capability of the first device 110 with respect to the transmission switching may be related to the number of switched transmitters allowed by the first device. In an example, the first device 110 may indicate the consecutive UL switching is not allowed between 2Tx on band 1, 2 and 2Tx on band 3, 4 to further reduce the interruptions.

In some example embodiments, the capability may need to be defined to indicate the silence period(s) and for each of switching cases or categories. For example, the indication may be related to a silence period of the transmission switching for the number of switched transmitters, a silence period of the transmission switching between TAGs, a silence period of the transmission switching within a TAG, and/or a silence period of the transmission switching for a combination of bands (or a band combination). As discussed above, different number of transmitters being switched may have different impact levels. Switches across TAGs and within a TAG may have different impact levels. Switches between different band combinations may also have different impact levels. Accordingly, different silence periods may be indicated depending on different requirements for these difference cases.

Alternatively, or in addition, the indication may be related to update of the capability. For example, the requirements such as parameters may be updated due to negative effects of Tx switching.

The at least one indication may be transmitted in at least one field of a capability message of the first device 110. For example, some new fields such as "ULTxSwitchingSilence-Period" may be added in the capability message such as UE Capability message in the case that the first device 110 operates as a UE. As an example, a field such as "Num-berOfTxChainsSwitched" may be used to indicate the consecutive UL switching is not allowed between 2Tx on band1,2 and 2Tx on band 3,4. A field such as "SilencePe-riodforSingleTAG" may be used to indicate a UL Tx switching silence period for 1TAG case. A field such as "Silence-PeriodforMultiTAGs" may be used to indicate UL Tx switching silence periods for multi TAGs case, such as 2TAGs scenario. A field such as "SilencePeriodsPerBand" may be used to indicate different silence periods for different Bands. This may depend upon the different impacts on different bands due to UL Tx switching. Update of UE capability may be included for Updated Silence periods due to negative effects of UL Tx switching.

In some example embodiments, the capability for the switching (or "switching capability") may be implicitly indicated based on pre-defined association between a switching period in the UE capability message and the switching capability, to achieve backward compatibility and signaling overhead reduction.

Based on the at least one indication of the capability form transmission switching from the first device 110, as shown in FIG. 2, the second device 120 transmits (220) to the first device 110 a configuration for the transmission switching. This configuration may be a semi-static (RRC-provided) configuration that sets the first device 110 to the Tx switching mode. This configuration may include a plurality of bands across which the UL transmission switching may occur. Alternatively, the first device 110, which may operate as a UE, may send or update the UE capability after this configuration message indicating the silence period relevant to the plurality of bands.

In some example embodiments, the second device 120 may transmit, to the first device 110, a command to switch transmission from a first set of bands to a second set of bands within the plurality of bands where a set of bands may comprise one or more bands. Such a command may be carried in a downlink control information (DCI) message which, for example, may be used to schedule UL transmission.

In an example, in the scenario of the switching across 3 or 4 bands, based on the configuration, the first device 110, which may operate as a UE, may not perform the UL Tx switching if it has performed an UL Tx switching within T seconds before receiving the command or DCI scheduling to change the carriers across 3 or 4 bands.

Alternatively, or in addition, the first device 110 may not perform UL Tx switching if it has performed an UL Tx switching between the carriers in a single TAG within SilencePeriodforSingleTAG, and it may not perform UL Tx switching if it has performed an UL Tx switching between the carriers across two TAGs within SilencePeriodforMul-tiTAGs before receiving the command or DCI scheduling to change the carriers across 3 or 4 bands. In other words, within these silence period after each switching, the first device 110 may be not expected to receive the DCI to dynamically change the carriers for UL transmission switching.

According to some example embodiments of the present disclosure, the first device 110, which may operate as a UE, may inform the network, for example, via the second device 120, how frequent the first device 110 can do consecutive UL Tx switching. Such information may be carried in new fields are introduced in UE Capability parameters. The number of symbols between switches may be not fixed but selected depending on the switching cases. The switching cases may be related the number of Tx chains switched, switching within 1 TAG or across 2 TAGS, different bands, or band combinations, and/or the like. Different durations of silence periods may be for different cases. Such a configuration of the switching may be more flexible and efficient.

Figure 3:
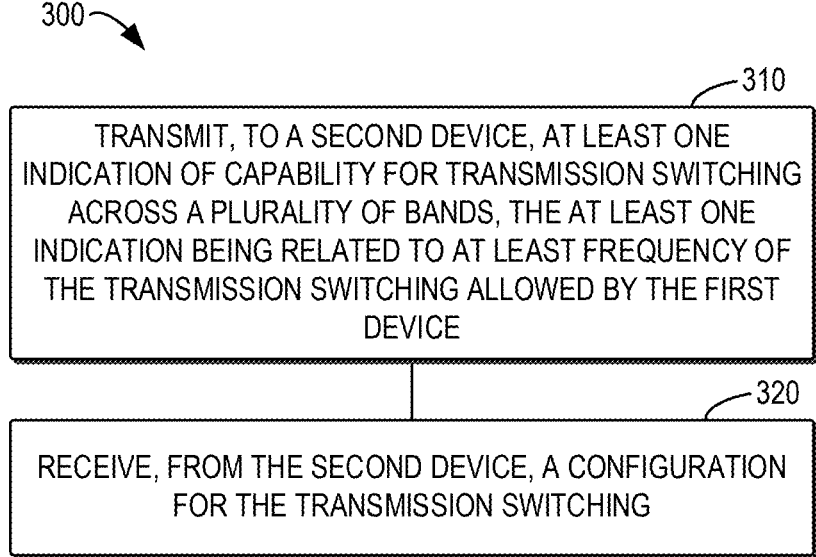
FIG. 3 illustrates a flowchart of a method implemented at a first device according to some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 in FIG. 1.

At block 310, the first device 110 transmits, to the second device 120, at least one indication of capability for transmission switching across a plurality of bands. The at least one indication is related to at least frequency of the transmission switching allowed by the first device. At block 320, the first device 110 receives, from the second device 120, a configuration for the transmission switching.

In some example embodiments, the first device 110 may receive, from the second device 120, a command to switch transmission from a first set of bands to a second set of bands within the plurality of bands.

In some example embodiments, the at least one indication may comprise at least one of: an indication for the number of transmission switching across the plurality of bands within a predetermined time period, or an indication for the number of time intervals between consecutive transmission switching.

In some example embodiments, the frequency of the transmission switching may be indicated for a combination of bands from among the plurality of bands, the transmission switching being performed between the combination of the bands.

In some example embodiments, the frequency of the transmission switching may be indicated based on an impact level of the transmission switching.

In some example embodiments, the impact level may be associated with at least one of: the number of switched transmitters in the transmission switching, a combination of bands in the transmission switching, interrupted bands in the transmission switching, the number of switched bands in the transmission switching, the number of downlink and/or uplink carriers impacted by the transmission switching, an aggregated bandwidth of impacted downlink and/or uplink carriers, the number of timing advance groups related to the transmission switching, or an interruption duration caused by the transmission switching.

In some example embodiments, the at least one indication may be further related to at least one of: the number of switched transmitters allowed by the first device, a silence period of the transmission switching for the number of switched transmitters, a silence period of the transmission switching between timing advance groups, a silence period of the transmission switching within a timing advance group, a silence period of the transmission switching for a combination of bands, or update of the capability.

In some example embodiments, the at least one indication may be transmitted in at least one field of a capability message of the first device 110.

FIG. 4 shows a flowchart of an example method 400 implemented at a second device in accordance with some example embodiments of the present disclosure. For the purpose of discussion, the method 400 will be described from the perspective of the second device 120 in FIG. 1.

At block 410, the second device 120 receives, from the first device 110, at least one indication of capability for transmission switching across a plurality of bands. The at least one indication is related to at least frequency of the transmission switching allowed by the first device. At block 420, the second device 120 transmits, to the first device 110, based on the at least one indication of the capability, a configuration for the transmission switching.

In some example embodiments, the second device 120 may transmit, to the first device 110, a command to switch transmission from a first set of bands to a second set of bands within the plurality of bands.

In some example embodiments, the at least one indication may comprise at least one of: an indication for the number of transmission switching across the plurality of bands within a predetermined time period, or an indication for the number of time intervals between consecutive transmission switching.

In some example embodiments, the frequency of the transmission switching may be indicated for a combination of bands from among the plurality of bands, the transmission switching being performed between the combination of the bands.

In some example embodiments, the frequency of the transmission switching is indicated based on an impact level of the transmission switching.

In some example embodiments, the impact level may be associated with at least one of: the number of switched transmitters in the transmission switching, a combination of bands in the transmission switching, interrupted bands in the transmission switching, the number of switched bands in the transmission switching, the number of downlink and/or uplink carriers impacted by the transmission switching, an aggregated bandwidth of impacted downlink and/or uplink carriers, the number of timing advance groups related to the transmission switching, or an interruption duration caused by the transmission switching.

In some example embodiments, the at least one indication may be further related to at least one of: the number of switched transmitters allowed by the first device, a silence period of the transmission switching for the number of switched transmitters, a silence period of the transmission switching between timing advance groups, a silence period of the transmission switching within a timing advance group, a silence period of the transmission switching for a combination of bands, or update of the capability.

In some example embodiments, the at least one indication may be received in at least one fields of a capability message of the first device 110.

All operations and features related to the first device 110 and the second device 120 as described above with reference to FIGS. 1 and 2 are likewise applicable to the methods 300 and 400 and have similar effects. For the purpose of simplification, the details will be omitted.

In some example embodiments, a first apparatus capable of performing any of the method 300 (for example, the first device 110 in FIG. 1) may comprise means for performing the respective operations of the method 300. The means may be implemented in any suitable form. For example, the means may be implemented in a circuitry or software module. The first apparatus may be implemented as or included in the first device 110 in FIG. 1.

In some example embodiments, the first apparatus comprises means for transmitting, to a second device, at least one indication of capability for transmission switching across a plurality of bands, the at least one indication being related to at least frequency of the transmission switching allowed by the first device; and means for receiving, from the second device, a configuration for the transmission switching.

In some example embodiments, the first apparatus further comprises: means for receiving, from the second device, a command to switch transmission from a first set of bands to a second set of bands within the plurality of bands.

In some example embodiments, the at least one indication comprises at least one of: an indication for the number of transmission switching across the plurality of bands within a predetermined time period, or an indication for the number of time intervals between consecutive transmission switching.

In some example embodiments, the frequency of the transmission switching is indicated for a combination of bands from among the plurality of bands, the transmission switching being performed between the combination of the bands.

In some example embodiments, the frequency of the transmission switching is indicated based on an impact level of the transmission switching.

In some example embodiments, the impact level is associated with at least one of: the number of switched transmitters in the transmission switching, a combination of bands in the transmission switching, interrupted bands in the transmission switching, the number of switched bands in the transmission switching, the number of downlink and/or uplink carriers impacted by the transmission switching, an aggregated bandwidth of impacted downlink and/or uplink carriers, the number of timing advance groups related to the transmission switching, or an interruption duration caused by the transmission switching.

In some example embodiments, the at least one indication is further related to at least one of: the number of switched transmitters allowed by the first device, a silence period of the transmission switching for the number of switched transmitters, a silence period of the transmission switching between timing advance groups, a silence period of the transmission switching within a timing advance group, a silence period of the transmission switching for a combination of bands, or update of the capability.

In some example embodiments, the at least one indication is transmitted in at least one field of a capability message of the first device.

In some example embodiments, the first apparatus further comprises means for performing other operations in some example embodiments of the method 300 or the first device 110. In some example embodiments, the means comprises at least one processor; and at least one memory storing instructions that, when executed by the at least one processor, cause the performance of the first apparatus.

In some example embodiments, a second apparatus capable of performing any of the method 400 (for example, the second device 120 in FIG. 1) may comprise means for performing the respective operations of the method 400. The means may be implemented in any suitable form. For example, the means may be implemented in a circuitry or software module. The second apparatus may be implemented as or included in the second device 120 in FIG. 1.

In some example embodiments, the second apparatus comprises means for receiving, from a first device, at least one indication of capability for transmission switching across a plurality of bands, the at least one indication being related to at least frequency of the transmission switching allowed by the first device; and means for transmitting, to the first device, based on the at least one indication of the capability, a configuration for the transmission switching.

In some example embodiments, the second apparatus further comprises: means for transmitting, to the first device, a command to switch transmission from a first set of bands to a second set of bands within the plurality of bands.

In some example embodiments, the at least one indication comprises at least one of: an indication for the number of transmission switching across the plurality of bands within a predetermined time period, or an indication for the number of time intervals between consecutive transmission switching.

In some example embodiments, the frequency of the transmission switching is indicated for a combination of bands from among the plurality of bands, the transmission switching being performed between the combination of the bands.

In some example embodiments, the frequency of the transmission switching is indicated based on an impact level of the transmission switching.

In some example embodiments, the impact level is associated with at least one of: the number of switched transmitters in the transmission switching, a combination of bands in the transmission switching, interrupted bands in the transmission switching, the number of switched bands in the transmission switching, the number of downlink and/or uplink carriers impacted by the transmission switching, an aggregated bandwidth of impacted downlink and/or uplink carriers, the number of timing advance groups related to the transmission switching, or an interruption duration caused by the transmission switching.

In some example embodiments, the at least one indication is further related to at least one of: the number of switched transmitters allowed by the first device, a silence period of the transmission switching for the number of switched transmitters, a silence period of the transmission switching between timing advance groups, a silence period of the transmission switching within a timing advance group, a silence period of the transmission switching for a combination of bands, or update of the capability.

In some example embodiments, the at least one indication is received in at least one fields of a capability message of the first device.

In some example embodiments, the second apparatus further comprises means for performing other operations in some example embodiments of the method 400 or the second device 120. In some example embodiments, the means comprises at least one processor; and at least one memory storing instructions that, when executed by the at least one processor, cause the performance of the second apparatus.

FIG. 5 is a simplified block diagram of a device 500 that is suitable for implementing example embodiments of the present disclosure. The device 500 may be provided to implement a communication device, for example, the first device 110 or the second device 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has one or more communication interfaces to facilitate communication with one or more other modules or devices. The communication interfaces may represent any interface that is necessary for communication with other network elements. In some example embodiments, the communication module 540 may include at least one antenna.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The instructions of the program 530 may include instructions for performing operations/acts of some example embodiments of the present disclosure. The program 530 may be stored in the memory, e.g., the ROM 524. The processor 510 may perform any suitable actions and processing by loading the program 530 into the RAM 522.

The example embodiments of the present disclosure may be implemented by means of the program 530 so that the device 500 may perform any process of the disclosure as discussed with reference to FIG. 2 to FIG. 4. The example embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

FIG. 6 shows an example of the computer readable medium 600 which may be in form of CD, DVD or other optical storage disk. The computer readable medium 600 has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory storing instructions that, when executed by the at least one processor, cause the first device at least to perform:
   transmitting, to a second device, at least one indication of capability for transmission switching across a plurality of bands, the at least one indication being related to at least frequency of the transmission switching allowed by the first device, wherein the at least one indication comprises an indication for the number of time intervals between consecutive transmission switching, wherein the at least one indication is further related to a silence period of the transmission switching for a combination of bands; and
   receiving, from the second device, a configuration for the transmission switching.

2. The first device of claim 1, wherein the first device is further caused to perform:
   receiving, from the second device, a command to switch transmission from a first set of bands to a second set of bands within the plurality of bands.

3. The first device of claim 1, wherein the at least one indication further comprises:
   an indication for the number of transmission switching across the plurality of bands within a predetermined time period.

4. The first device of claim 1, wherein the frequency of the transmission switching is indicated for a combination of bands from among the plurality of bands, the transmission switching being performed between the combination of the bands.

5. The first device of claim 1, wherein the frequency of the transmission switching is indicated based on an impact level of the transmission switching.

6. The first device of claim 5, wherein the impact level is associated with at least one of:
   the number of switched transmitters in the transmission switching,
   a combination of bands in the transmission switching,
   interrupted bands in the transmission switching,
   the number of switched bands in the transmission switching,
   the number of downlink and/or uplink carriers impacted by the transmission switching, an aggregated bandwidth of impacted downlink and/or uplink carriers, the number of timing advance groups related to the transmission switching, or an interruption duration caused by the transmission switching.

7. The first device of claim 1, wherein the at least one indication is further related to at least one of:

the number of switched transmitters allowed by the first device, a silence period of the transmission switching for the number of switched transmitters, a silence period of the transmission switching between timing advance groups, a silence period of the transmission switching within a timing advance group, or update of the capability.

8. The first device of claim 1, wherein the at least one indication is transmitted in at least one field of a capability message of the first device.

9. A second device comprising:

at least one processor; and at least one memory storing instructions that, when executed by the at least one processor, cause the second device at least to perform: receiving, from a first device, at least one indication of capability for transmission switching across a plurality of bands, the at least one indication being related to at least frequency of the transmission switching allowed by the first device, wherein the at least one indication comprises an indication for the number of time intervals between consecutive transmission switching, wherein the at least one indication is further related to a silence period of the transmission switching for a combination of bands; and transmitting, to the first device, based on the at least one indication of the capability, a configuration for the transmission switching.

10. The second device of claim 9, wherein the second device is further caused to perform:

transmitting, to the first device, a command to switch transmission from a first set of bands to a second set of bands within the plurality of bands.

11. The second device of claim 9, wherein the at least one indication further comprises:

an indication for the number of transmission switching across the plurality of bands within a predetermined time period.

12. The second device of claim 9, wherein the at least one indication is further related to at least one of:

the number of switched transmitters allowed by the first device, a silence period of the transmission switching for the number of switched transmitters, a silence period of the transmission switching between timing advance groups, a silence period of the transmission switching within a timing advance group, or update of the capability.

13. A method comprising:

at a first device, transmitting, to a second device, at least one indication of capability for transmission switching across a plurality of bands, the at least one indication being related to at least frequency of the transmission switching allowed by the first device, wherein the at least one indication comprises an indication for the number of time intervals between consecutive transmission switching, wherein the at least one indication is further related to a silence period of the transmission switching for a combination of bands; and receiving, from the second device, a configuration for the transmission switching.

14. The method of claim 13, further comprising:

receiving, from the second device, a command to switch transmission from a first set of bands to a second set of bands within the plurality of bands.

15. The method of claim 13, wherein the at least one indication comprises at least one of:

an indication for the number of transmission switching across the plurality of bands within a predetermined time period, or an indication for the number of time intervals between consecutive transmission switching.

16. The method of claim 13, wherein the frequency of the transmission switching is indicated for a combination of bands from among the plurality of bands, the transmission switching being performed between the combination of the bands.

17. The method of claim 13, wherein the frequency of the transmission switching is indicated based on an impact level of the transmission switching.

18. The method of claim 17, wherein the impact level is associated with at least one of:

the number of switched transmitters in the transmission switching, a combination of bands in the transmission switching, interrupted bands in the transmission switching, the number of switched bands in the transmission switching, the number of downlink and/or uplink carriers impacted by the transmission switching, an aggregated bandwidth of impacted downlink and/or uplink carriers, the number of timing advance groups related to the transmission switching, or an interruption duration caused by the transmission switching.

19. The method of claim 13, wherein the at least one indication is further related to at least one of:

the number of switched transmitters allowed by the first device, a silence period of the transmission switching for the number of switched transmitters, a silence period of the transmission switching between timing advance groups, a silence period of the transmission switching within a timing advance group, or update of the capability.

20. The method of claim 13, wherein the at least one indication is transmitted in at least one field of a capability message of the first device.

* * * * *